United States Patent
Lee et al.

(10) Patent No.: US 9,208,088 B2
(45) Date of Patent: Dec. 8, 2015

(54) SHARED VIRTUAL MEMORY MANAGEMENT APPARATUS FOR PROVIDING CACHE-COHERENCE

(71) Applicant: Seoul National University R&DB Foundation, Seoul (KR)

(72) Inventors: Jaejin Lee, Seoul (KR); Junghyun Kim, Hwaseong-si (KR)

(73) Assignee: Seoul National University R&DB Foundation, Seoul (KR)

( * ) Notice: Subject to any disclaimer, the term of this patent is extended or adjusted under 35 U.S.C. 154(b) by 183 days.

(21) Appl. No.: 13/733,396

(22) Filed: Jan. 3, 2013

(65) Prior Publication Data

US 2014/0040563 A1  Feb. 6, 2014

(30) Foreign Application Priority Data

Jan. 3, 2012  (KR) .................. 10-2012-0000612

(51) Int. Cl.
| | | |
|---|---|---|
| G06F 12/00 | (2006.01) | |
| G06F 12/08 | (2006.01) | |
| G06F 12/10 | (2006.01) | |
| G06F 13/00 | (2006.01) | |
| G06F 13/28 | (2006.01) | |

(52) U.S. Cl.
CPC ........ *G06F 12/0815* (2013.01); *G06F 12/0837* (2013.01); *G06F 12/109* (2013.01); *G06F 2212/656* (2013.01)

(58) Field of Classification Search
CPC .......... G06F 12/0815; G06F 2212/656; G06F 12/0837; G06F 12/109
USPC ........................................ 711/144, 147, 150
See application file for complete search history.

(56) References Cited

U.S. PATENT DOCUMENTS

| | | | | |
|---|---|---|---|---|
| 5,361,340 | A | * | 11/1994 | Kelly et al. .................... 711/3 |
| 5,522,045 | A | | 5/1996 | Sandberg |
| 5,592,625 | A | | 1/1997 | Sandberg |
| 5,897,664 | A | * | 4/1999 | Nesheim et al. ............ 711/206 |
| 6,496,909 | B1 | * | 12/2002 | Schimmel .................... 711/163 |
| 6,684,305 | B1 | | 1/2004 | Deneau |
| 6,904,490 | B2 | | 6/2005 | Arimilli et al. |
| 7,680,987 | B1 | * | 3/2010 | Clark et al. .................. 711/147 |
| 7,996,644 | B2 | * | 8/2011 | Kottapalli .................... 711/173 |
| 8,032,488 | B2 | * | 10/2011 | Lashley et al. .............. 707/613 |
| 8,607,004 | B2 | * | 12/2013 | Anderson .................... 711/153 |
| 2002/0019913 | A1 | * | 2/2002 | Shimizu et al. ............. 711/141 |
| 2003/0018737 | A1 | * | 1/2003 | Buhlman et al. ............ 709/213 |
| 2010/0332693 | A1 | * | 12/2010 | Ben-Yehuda et al. ......... 710/22 |
| 2011/0153957 | A1 | | 6/2011 | Gao et al. |

FOREIGN PATENT DOCUMENTS

| | | |
|---|---|---|
| JP | 6-19785 | 1/1994 |
| KR | 10-2003-0092101 | 12/2003 |
| KR | 10-2004-0032745 | 4/2004 |
| KR | 10-2011-0073339 | 6/2011 |

* cited by examiner

*Primary Examiner* — Mark Giardino, Jr.

(57) ABSTRACT

A shared virtual memory management apparatus for ensuring cache coherence. When two or more cores request write permission to the same virtual memory page, the shared virtual memory management apparatus allocates a physical memory page for the cores to change data in the allocated physical memory page. Thereafter, changed data is updated in an original physical memory page, and accordingly it is feasible to achieve data coherence in a multi-core hardware environment that does not provide cache coherence.

16 Claims, 6 Drawing Sheets

SHARED VIRTUAL MEMORY MANAGEMENT APPARATUS FOR PROVIDING CACHE-COHERENCE

CROSS REFERENCE TO RELATED APPLICATIONS

Pursuant to 35 U.S.C. §119(a), this application claims the benefit of earlier filing date and right of priority to Korean Application No. 10-2012-0000612, filed on Jan. 3, 2012, the contents of which is incorporated by reference herein in its entirety.

BACKGROUND

1. Field

The present invention relates to shared virtual memory management, and more particularly, to a shared virtual memory management apparatus for ensuring cache coherence.

2. Description of the Related Art

U.S. Pat. No. 5,592,625 (Jan. 7, 1997) discloses shared virtual memory management based on a memory address translation by use of an adapter card equipped with an input/output buffer, a page table and a control/state register translating all addresses, memory mapping, and packet generation.

A software shared virtual memory uses paging of the shared memory. When an application accesses a certain page for the first time, a page fault is generated, and a page fault handler allocates the page to the application using page fault information.

The software shared virtual memory modifies the page fault handler to ensure data consistency between a plurality of processors at a page level.

Cache coherence protocols are employed to provide data coherence in a hardware manner. Since the cache coherence protocols are built into most existing multicore chips, programmers can easily program using a shared memory programming model. However, an increase in the number of cores may cause a problem of scalability, and thus there may be a need for a substitution method.

When the number of cores increase, the existing methods for ensuring cache coherence have a limitation in improving the overall system performance due to an increase in number of communications. Therefore, a method for ensuring cache coherence using the software shared virtual memory is suggested to provide data consistency in an environment that does not support cache coherence.

RELATED ART DOCUMENTS

Patent Documents

1. U.S. Pat. No. 5,592,625 (Jan. 7, 1997)

SUMMARY

One objective of the present invention is to provide a shared virtual memory management apparatus to ensure cache coherence using software shared virtual memory and thereby providing data consistency in an environment that does not support cache coherence.

According to one general aspect of the present invention, there is provided a shared virtual memory management apparatus to ensure cache coherence, comprising: a shared virtual memory manager configured to allocate a shared virtual memory page shared by a plurality of cores and to manage cores' access to the allocated shared virtual memory page; a physical memory manager configured to allocate a physical memory page when a plurality of cores simultaneously access the allocated shared virtual memory page, and to update contents of the shared virtual memory page written by any of the cores in the allocated physical memory page; and a memory mapper configured to, when the contents of the shared virtual memory page written by any of the plurality of cores are updated in the physical memory page allocated by the physical memory manager, map the updated physical memory page to the shared virtual memory page of another core that does not perform a write operation to the shared virtual memory page.

DETAILED DESCRIPTION

Figure 1:
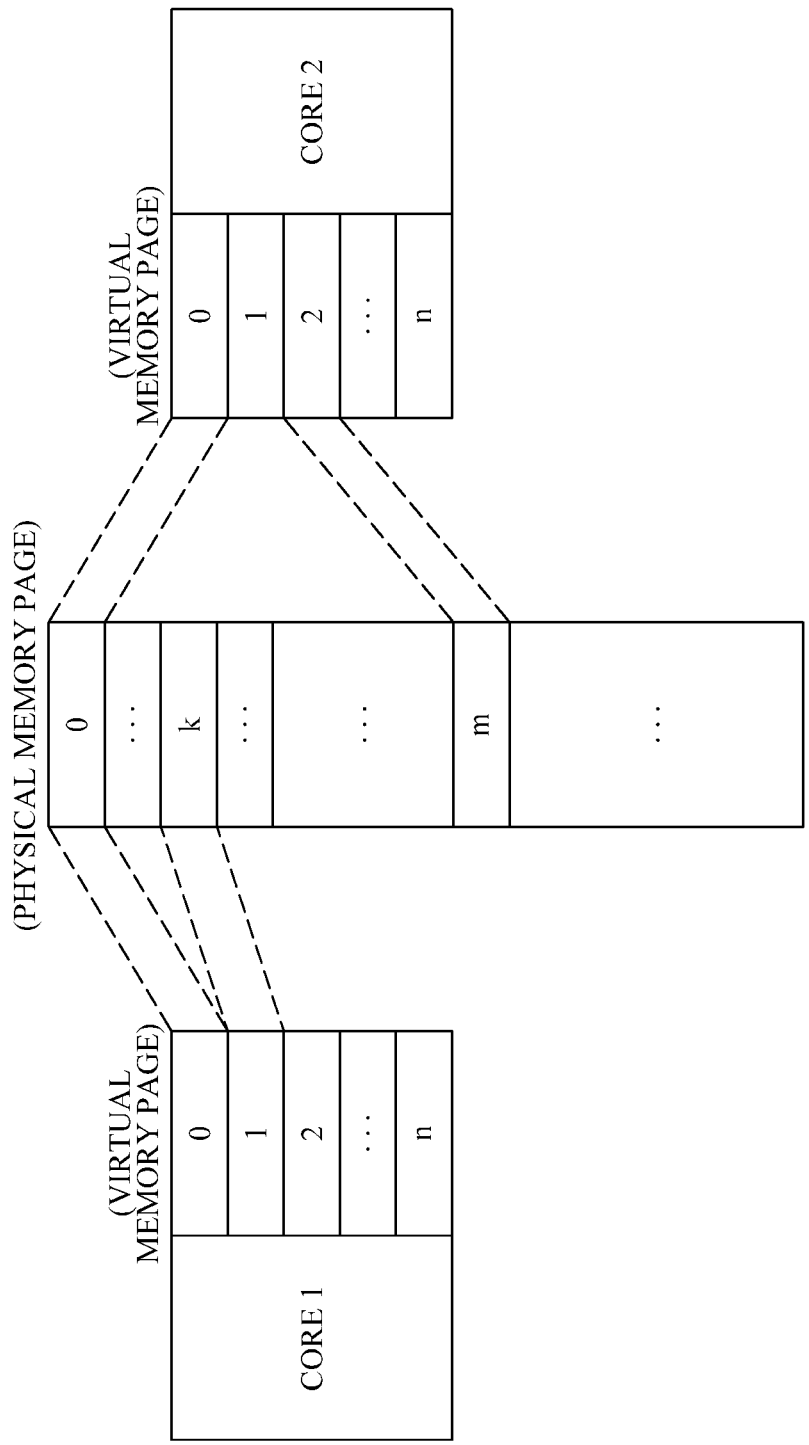
FIG. 1 is a diagram illustrating an example of memory structure in a multi-core chip hardware environment.

The invention is described more fully hereinafter with references to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of X, Y, and Z" can be construed as X only, Y only, Z only, or any combination of two or more items X, Y, and Z (e.g., XYZ, XZ, XYY, YZ, ZZ). Throughout the drawings and the detailed description, unless otherwise described, the same drawing reference numerals are understood to refer to the same elements, features, and structures. The relative size and depiction of these elements may be exaggerated for clarity, illustration, and convenience.

In a multi-core chip (processor) environment that does not ensure cache coherence, access of two or more cores to the same memory may cause a data consistency problem.

For example, when it is assumed that data is read from a specific physical memory address by core 1 and loaded into cache and thereafter core 2 writes a new value to the physical memory address, the value written by core 2 cannot be read by core 1 unless cache coherence is ensured.

This is because since the data associated with the physical memory address has been loaded into the cache of core 1, core 1 only can read the data that has already been loaded into the cache thereof when attempting to read the value of the physical memory address again. In this case, to enable core 1 to read the new value updated by core 2, the contents of cache of core 1 should be cleared and core 1 needs to retrieve new data from main memory.

As another example, it is assumed that core 1 has accessed virtual memory address 0x1000 and updated data and core 2 has accessed virtual memory address 0x1004 and updated data. Also, it is assumed that cache has write-back policy and a cache line is 32 bytes long.

Data which has been updated to virtual memory address 0x1000 by core 1 is updated to main memory according to cache replacement schemes after a predetermined period of time. Thereafter, data which has been updated to virtual memory address 0x1004 by core 2 is also updated to the main memory according to cache replacement schemes after a predetermined period of time.

In this case, since write-back cache updates all relevant cache lines, all cache lines of core 2 are updated to the main memory. At this time, a value updated by core 1 is cleared to the value updated by core 2, and hence such problems need to be resolved.

FIG. 1 is a diagram illustrating an example of memory structure in a multi-core chip hardware environment. In the multi-core chip hardware environment, due to the nature of hardware, the whole physical memory area can be accessed by any cores (processors), and thus specific physical address regions may be mapped to specific virtual address regions using a page table.

Referring to FIG. 1, since virtual memory address pages of both core 1 and core 2 are mapped to the same physical memory address page 0, the two cores can read and write the same value. However, as described above, due to the cache coherence problem, when the both cores simultaneously change the corresponding physical memory page, it is not possible to map same physical memory page to the virtual memory page.

For example, if a plurality of cores attempt to map to one physical memory page at the same time, only one core among the attempting cores is able to obtain permission to write to the physical memory page. In other words, all cores access the corresponding physical memory page with read permission or only one core having write permission can access the physical memory page.

According to the present invention, when two or more cores request the permission to write to the same virtual memory page at the same time, in an effort to ensure cache coherence, different physical memory pages are allocated to the requesting cores, the cores change data in the corresponding physical memory pages allocated thereto, and only the changed data is updated to the original physical memory page.

In this case, if the write-back policy is applied to the physical memory pages, updates are made on a cache-line basis, resulting in data inconsistency, and hence to prevent such data inconsistency, the physical memory pages are set to uncacheable such that only the updated data is reflected to the physical page.

Figure 2:
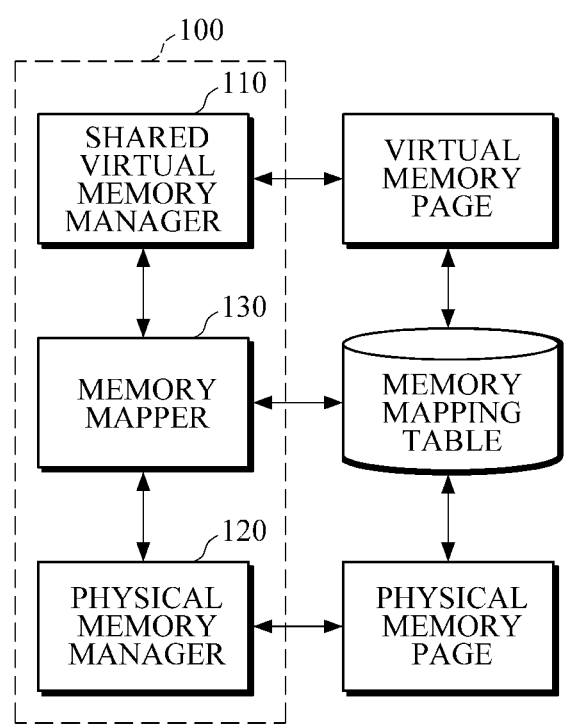
FIG. 2 is a block diagram illustrating an example of the shared virtual memory management apparatus for ensuring cache coherence according to an exemplary embodiment of the present invention.

FIG. 2 is a block diagram illustrating an example of a shared virtual memory management apparatus for ensuring cache coherence according to an exemplary embodiment of the present invention. Referring to FIG. 2, the shared virtual memory management apparatus 100 includes a shared virtual memory manager 110, a physical memory manager 120, and a memory mapper 130.

The shared virtual memory manager 110 allocates a shared virtual memory page to be shared by a plurality of cores, and manages cores' access to the allocated shared virtual memory page.

In a multi-core environment, before each core writes data to an actual physical memory page, the shared virtual memory management apparatus 100 uses the shared virtual memory manager 110 to allocate the shared virtual memory page to be mapped to a physical memory page and manages the cores' access to the allocated shared virtual memory pate using a memory mapping table.

When a plurality of cores access the shared virtual memory page which has been allocated by the shared virtual memory manager 110, the physical memory manager 120 allocates physical memory pages to the cores and updates the contents of the shared virtual memory page written by the core in the allocated physical memory page corresponding to the writing core.

In this case, the physical memory manager 120 may be configured to allocate a physical memory page when the shared virtual memory page allocated by the shared virtual memory manager 110 has been accessed by one core with write permission and another core attempts to access the same shared virtual memory page with write permission as well.

When the contents of the shared virtual memory page written by one core are updated in the physical memory page allocated by the physical memory manager 120, the memory mapper 130 maps the updated physical memory page to the shared virtual memory page of other cores that do not perform a write operation to the shared virtual memory page.

By doing so, when two or more cores request the permission to write to the same virtual memory page at the same time, physical memory pages are allocated to the cores, the cores changes data in the allocated physical memory pages, and then the changed data is updated in an original physical memory page mapped to the shared virtual memory page, so that data consistency can be ensured in a multi-core hardware environment which does not provide cache coherence.

In this case, according to a write-back policy applied to the corresponding physical memory page, update is made on a cache-line basis, which results in data inconsistency. Thus to avoid such inconsistency, the physical memory page is set to uncacheable to accurately reflect updated data therein.

According to additional aspect of the invention, the physical memory manager 120 may be configured to update the allocated physical memory page with the contents of the shared virtual memory page written by the core that has most recently performed the memory unlock operation when it is determined that there are cores with memory unlocked.

In this case, the shared virtual memory manager 110 may be configured to allow write permission access of another core to the same shared virtual memory page when the contents of the shared virtual memory page written by the core with memory unlocked are updated in the physical memory page.

Figure 3:
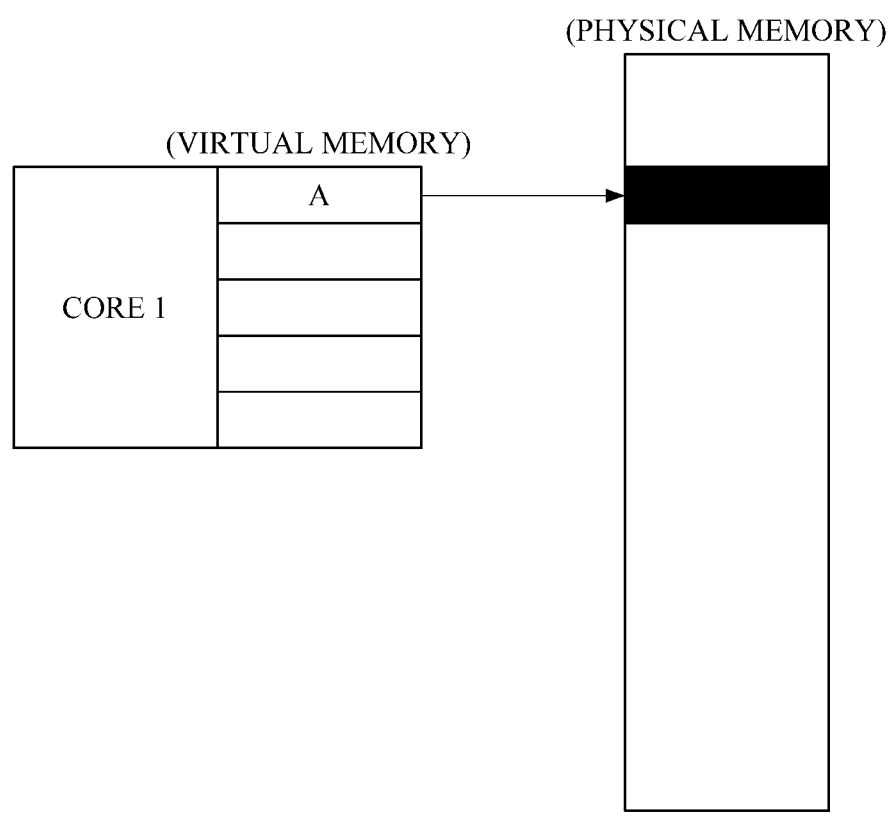
FIGS. 3 to 5 are diagrams illustrating the physical memory allocation process performed by the shared virtual memory management apparatus according to the exemplary embodiment of the present invention.
Figure 4:
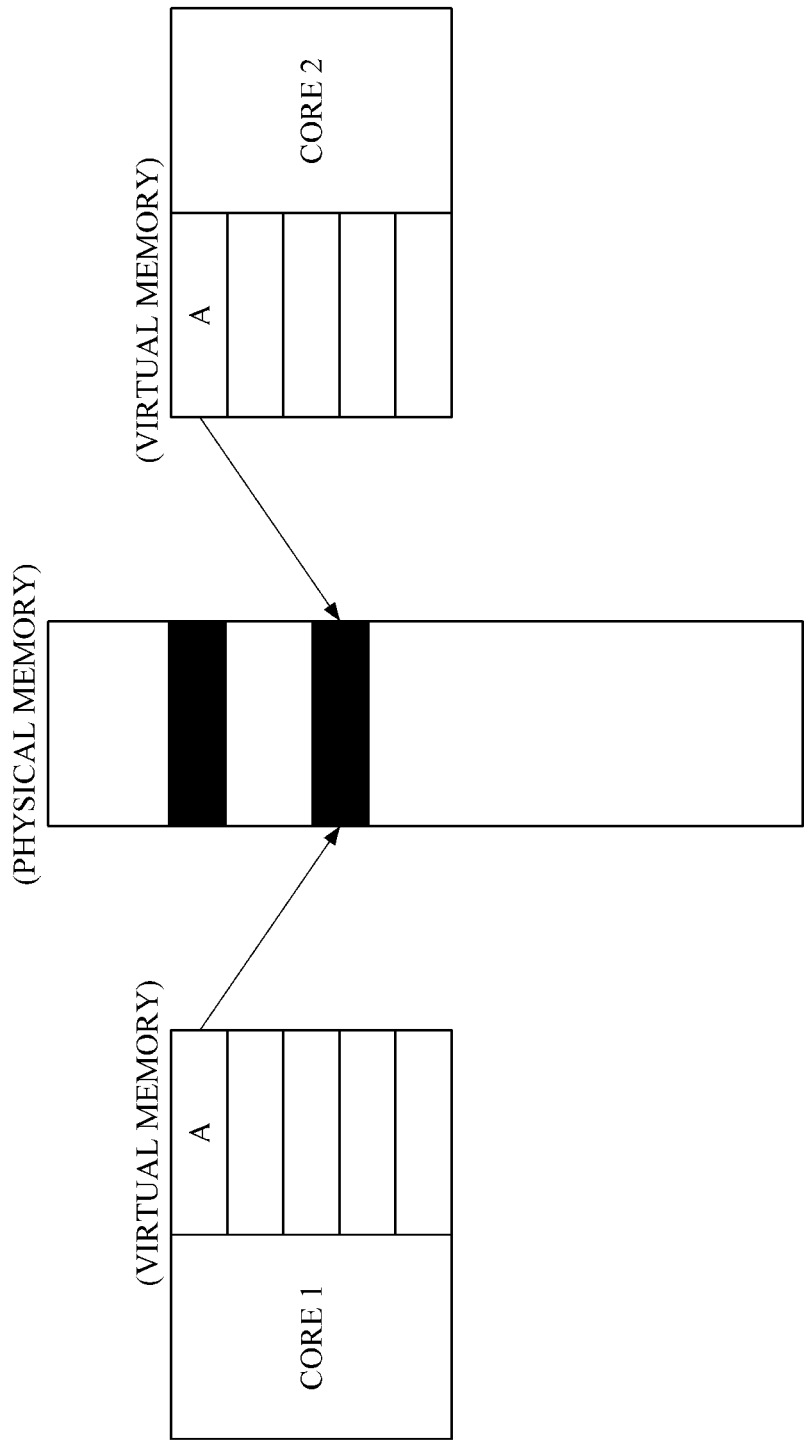
Figure 5:
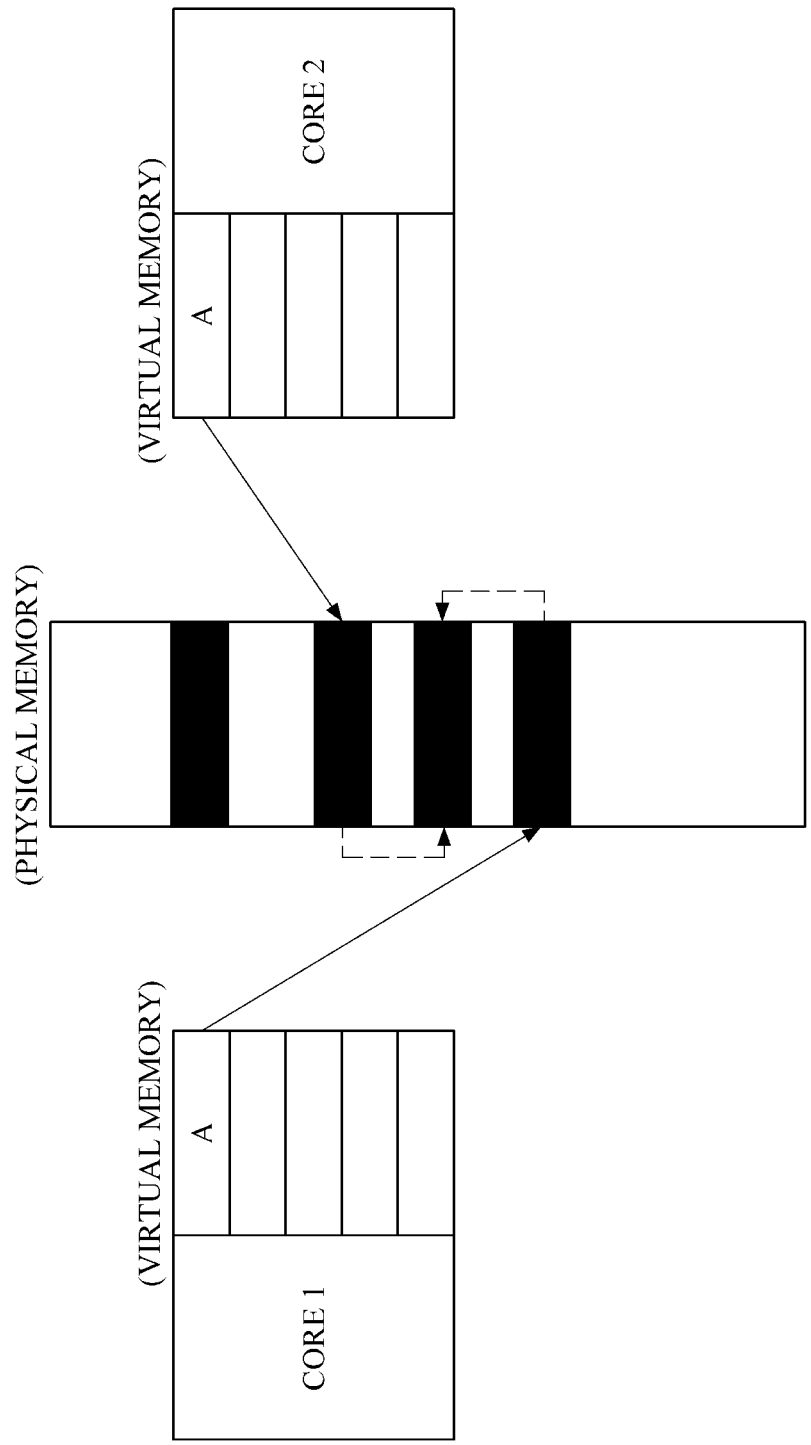

FIGS. 3 to 5 are diagrams illustrating physical memory allocation process performed by a shared virtual memory management apparatus according to an exemplary embodiment of the present invention. For example, when core 1 accesses allocated shared virtual memory page A for the very first time, a read page fault is generated, and because there is no core whose memory is unlocked, the physical memory manager 120 (refer to FIG. 2) allocates a new physical memory page to be mapped to the shared virtual memory page as shown in FIG. 3 according to process of a general page fault handler.

With memory locked, only one core is allowed to access a shared virtual memory page, and with memory unlocked, a plurality of cores are allowed to access the shared virtual memory page.

In response to the generation of a write page fault, core 1 may acquire write permission and then modify the shared virtual memory page. For example, if the permission of core 1 to write to the corresponding shared virtual memory page is released according to a release consistency model, core 1 enters in memory-unlock state.

Thereafter, when core 2 requests access to the shared virtual memory page A, since core 1 is in memory-unlock state, the physical memory manager 120 allocates a new physical memory page as shown in FIG. 4 and updates the contents of the shared virtual memory page A of core 1 in the allocated new physical memory page.

In this case, the reason why the contents of the shared virtual memory page changed by core 1 are copied after the physical memory manager 120 allocates the new physical memory page is because the changed contents may be updated only in cache but not in main memory. Thus, uncacheable data is written in the allocated new physical memory page, and thereby all contents changed by core 1 are updated in main memory, ensuring the cache coherence.

Then, core 2 maps the allocated new physical memory page to its own shared virtual memory page. By doing so, core 2 can read the updated contents written by core 1 from the shared virtual memory page area, and thus cache coherence can be ensured.

According to additional aspects of the present invention, in the case in which a plurality of cores with memory unlocked are present, the physical memory manager 120 may be configured to allocate physical memory pages to the respective cores with memory unlocked, and to allow the cores with memory unlocked to update the contents of the shared virtual memory page written by the cores in their allocated physical memory pages.

Here, the physical memory manager 120 may be configured to further allocate an additional physical memory page to simultaneously update the contents of the shared virtual memory page written by all cores with memory unlocked.

In addition, the physical memory manager 120 may be configured to ensure cache coherence by sequentially writing the contents of the shared virtual memory page written by each of the cores with memory unlocked in the additionally allocated physical memory page.

Further, the physical memory manager 120 may be configured to update the contents written in the additionally allocated physical memory page for providing cache coherence in both the shared virtual memory page and a physical memory page actually mapped to the shared virtual memory page.

Referring to FIG. 5, if core 1 attempts to access shared virtual memory page A again when core 2 is accessing shared virtual memory page A, the single shared virtual memory page can be changed by two cores at the same time.

The physical memory manager 120 allocates a new physical memory page for core 1, and updates shared virtual memory page A of core 2 in the new allocated physical memory page.

Then, the physical memory manager 120 further allocates an additional physical memory page to be simultaneously updated with the contents of shared virtual memory page A changed by each of core 1 and core 2, and core 1 and core 2 sequentially write the contents of shared virtual memory page A updated in the physical memory pages, which have been previously allocated to the respective core 1 and core 2, to the additionally allocated physical memory page at release point, thereby simultaneously updating the contents of shared virtual memory page A changed by each of core 1 and core 2.

In addition, the physical memory manager 120 writes the contents, which has been written in the additionally allocated physical memory page for providing cache coherence, in a physical memory page that is actually mapped to shared virtual memory page A, thereby updating the main memory with the contents written in caches of each of the cores.

Figure 6:
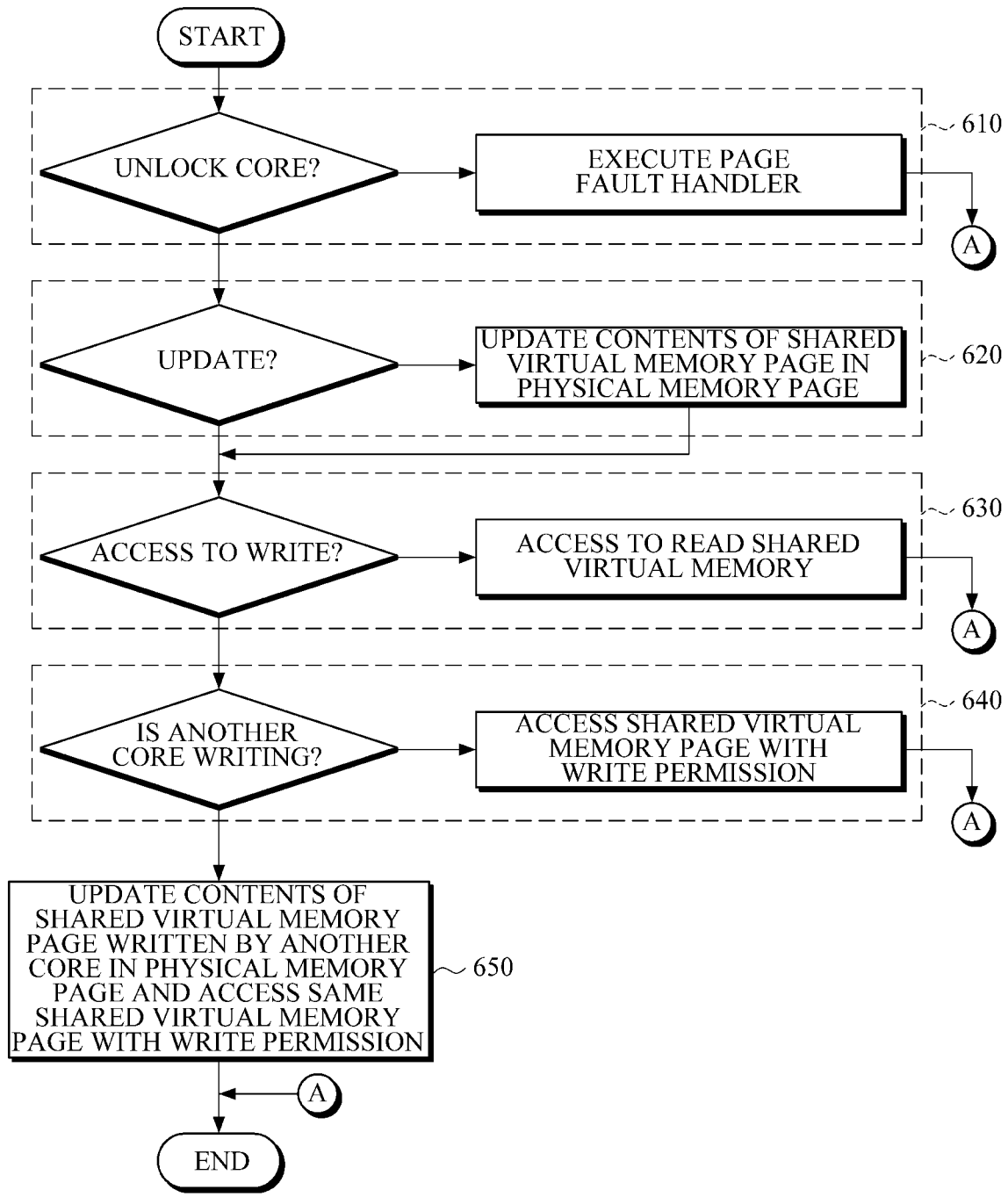
FIG. 6 is a flowchart illustrating operations of the shared virtual memory management apparatus for ensuring cache coherence according to the exemplary embodiment of the present invention.

Operations of the above-described apparatus for managing shared virtual memory will be described with reference to FIG. 6. FIG. 6 is a flowchart illustrating operations of a shared virtual memory management apparatus for ensuring cache coherence according to an exemplary embodiment of the present invention.

When a particular core accesses a shared virtual memory page, a shared virtual memory management apparatus for ensuring cache coherence determines whether there is a core with memory unlocked in 610. If it is determined that there is no core with memory unlocked, the shared virtual memory management apparatus executes general page fault handler to write the shared virtual memory page.

If there is a core with memory unlocked, in 620, the shared virtual memory management apparatus determines whether the contents of shared virtual memory written by the core with memory unlocked are updated in a physical memory page, and if the contents are not updated, the shared virtual memory management apparatus updates the contents in a physical memory page allocated to be mapped to the shared virtual memory page.

Once the contents of the shared virtual memory page written by the core with memory unlocked are updated in the physical memory page, the shared virtual memory management apparatus determines, in 630, whether the accessing core has write permission and, if the core does not have write permission, the shared virtual memory management apparatus accesses the shared virtual memory with read permission.

If the accessing core has write permission, the shared virtual memory management apparatus determines, in 640, whether another core is writing data to the shared virtual memory page, and, if the writing is not in progress, the shared virtual memory management apparatus accesses the shared virtual memory page with write permission.

If another core is writing data to the shared virtual memory page, in 650, the shared virtual memory management apparatus updates the contents of the shared virtual memory page being written by the other core in the physical memory page allocated to the core that is accessing the shared virtual memory page with write permission, and accesses the shared virtual memory page with write permission.

As apparent from the above description, when two or more cores request write permission to the same virtual memory page at the same time, one or more physical memory pages are allocated to the requesting cores, data change is performed in the allocated physical memory pages, and only the changed data is updated to an original physical memory page. Accordingly, data consistency can be ensured even in an environment that does not support cache coherence.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A shared virtual memory management apparatus for ensuring cache coherence, comprising:
    a plurality of cores which do not have individually designated physical memories but have one shared physical memory;
    a shared virtual memory manager configured to allocate a shared virtual memory page shared by a plurality of cores and to manage cores' access to the allocated shared virtual memory page;

a physical memory manager configured to allocate a physical memory page when the plurality of cores simultaneously access the allocated shared virtual memory page, and to update contents of the shared virtual memory page written by any of the cores in the allocated physical memory page of the shared physical memory; and a memory mapper configured to, when the contents of the shared virtual memory page written by any of the plurality of cores are updated in the physical memory page allocated by the physical memory manager, map the updated physical memory page to the shared virtual memory page of another core that does not perform a write operation to the shared virtual memory page, wherein the physical memory manager reflects accurately updated data to the physical memory page by setting the physical memory page to uncacheable in order to avoid data inconsistency which may be caused by update on a cache-line basis, and wherein in response to the shared virtual memory page being changed by two cores at the same time, the physical memory manager allocates a new physical memory page for one core, and updates shared virtual memory page of another core in the new allocated physical memory page, and further allocates an additional physical memory page to be simultaneously updated with the contents of shared virtual memory page changed by each of the two cores and the two cores sequentially write the contents of shared virtual memory page updated in the physical memory pages, which have been previously allocated to the respective two cores, to the additionally allocated physical memory page at release point, thereby simultaneously updating the contents of shared virtual memory paged changed by each of the two cores.

2. The shared virtual memory management apparatus of claim 1, wherein the physical memory manager is configured to allocate a physical memory page when one core with write permission is accessing the allocated shared virtual memory page which has already been accessed by another core with write permission.

3. The shared virtual memory management apparatus of claim 2, wherein the physical memory manager is configured to update the allocated physical memory page with contents of the shared virtual memory page written by a core that has most recently performed a memory-unlock operation when it is determined that cores with memory unlocked are present.

4. The shared virtual memory management apparatus of claim 3, wherein the shared virtual memory manager is configured to, when the contents of the shared virtual memory page written by the core with memory unlocked is updated in the physical memory page, allow write permission access of another core to the same shared virtual memory page.

5. The shared virtual memory management apparatus of claim 3, wherein the physical memory manager is configured to, when there are a plurality of cores with memory unlocked, allocate physical memory pages to the respective cores with memory unlocked and update the corresponding physical memory pages allocated to the respective cores with contents of the shared virtual memory page written by each of the cores with memory unlocked.

6. The shared virtual memory management apparatus of claim 5, wherein the physical memory manager is configured to further allocate an additional physical memory page in which contents of the shared virtual memory page written by all cores with memory unlocked are to be updated simultaneously.

7. The shared virtual memory management apparatus of claim 6, wherein the physical memory manager is configured to ensure cache coherence by sequentially writing the contents of the shared virtual memory page written by each of the cores with memory unlocked in the additionally allocated physical memory page.

8. The shared virtual memory management apparatus of claim 7, wherein the physical memory manager is configured to update the contents written in the additionally allocated physical memory page for providing cache coherence in a physical memory page that is actually mapped to the shared virtual memory page.

9. A shared virtual memory management apparatus for ensuring cache coherence, comprising:

a shared physical memory;

a plurality of cores each configured to access the shared physical memory as its respective main memory;

a shared virtual memory manager configured to allocate a shared virtual memory page shared by a plurality of cores and to manage cores' access to the allocated shared virtual memory page;

a physical memory manager configured to allocate a physical memory page when the plurality of cores simultaneously access the allocated shared virtual memory page, and to update contents of the shared virtual memory page written by any of the cores in the allocated physical memory page of the shared physical memory; and a memory mapper configured to, when the contents of the shared virtual memory page written by any of the plurality of cores are updated in the physical memory page allocated by the physical memory manager, map the updated physical memory page to the shared virtual memory page of another core that does not perform a write operation to the shared virtual memory page, wherein the physical memory manager reflects accurately updated data to the physical memory page by setting the physical memory page to uncacheable in order to avoid data inconsistency which may be caused by update on a cache-line basis, and wherein in response to the shared virtual memory page being changed by two cores at the same time, the physical memory manager allocates a new physical memory page for one core, and updates shared virtual memory page of another core in the new allocated physical memory page, and further allocates an additional physical memory page to be simultaneously updated with the contents of shared virtual memory page changed by each of the two cores and the two cores sequentially write the contents of shared virtual memory page updated in the physical memory pages, which have been previously allocated to the respective two cores, to the additionally allocated physical memory page at release point, thereby simultaneously updating the contents of shared virtual memory paged changed by each of the two cores.

10. The shared virtual memory management apparatus of claim 9, wherein the physical memory manager is configured to allocate a physical memory page when one core with write permission is accessing the allocated shared virtual memory page which has already been accessed by another core with write permission.

11. The shared virtual memory management apparatus of claim 10, wherein the physical memory manager is configured to update the allocated physical memory page with contents of the shared virtual memory page written by a core that has most recently performed a memory-unlock operation when it is determined that cores with memory unlocked are present.

12. The shared virtual memory management apparatus of claim 11, wherein the shared virtual memory manager is configured to, when the contents of the shared virtual memory page written by the core with memory unlocked is updated in the physical memory page, allow write permission access of another core to the same shared virtual memory page.

13. The shared virtual memory management apparatus of claim 11, wherein the physical memory manager is configured to, when there are a plurality of cores with memory unlocked, allocate physical memory pages to the respective cores with memory unlocked and update the corresponding physical memory pages allocated to the respective cores with contents of the shared virtual memory page written by each of the cores with memory unlocked.

14. The shared virtual memory management apparatus of claim 13, wherein the physical memory manager is configured to further allocate an additional physical memory page in which contents of the shared virtual memory page written by all cores with memory unlocked are to be updated simultaneously.

15. The shared virtual memory management apparatus of claim 14, wherein the physical memory manager is configured to ensure cache coherence by sequentially writing the contents of the shared virtual memory page written by each of the cores with memory unlocked in the additionally allocated physical memory page.

16. The shared virtual memory management apparatus of claim 15, wherein the physical memory manager is configured to update the contents written in the additionally allocated physical memory page for providing cache coherence in a physical memory page that is actually mapped to the shared virtual memory page.

* * * * *